April 25, 1933.   L. H. WELLENSIEK   1,905,078
CORE DRILL REAMER
Filed Oct. 5, 1931

LOUIS H. WELLENSIEK  INVENTOR
BY Jesse R. Stone
ATTORNEY

Patented Apr. 25, 1933

1,905,078

UNITED STATES PATENT OFFICE

LOUIS H. WELLENSIEK, OF HOUSTON, TEXAS, ASSIGNOR TO HUGHES TOOL COMPANY, OF HOUSTON, TEXAS, A CORPORATION OF TEXAS

CORE DRILL REAMER

Application filed October 5, 1931. Serial No. 566,856.

My invention relates to core drills such as are used in drilling deep wells to obtain a sample of the formation being encountered.

In roller core drills of this character, it is not feasible to have cutters of large diameter mounted to cut a wide clearance on the wall of the well. With the present type of roller core drill for cutting hard formation, it is therefore difficult to prevent the outer diameter of the hole from decreasing slightly as the drill progresses due to wear on the cutters. Hence when the bit is withdrawn and a new drill is substituted, there is a large amount of reaming necessary to get the hole of uniform diameter and to allow the drill to reach bottom.

It is an object of my invention to provide a reamer for use on core drills of this character which will ream the hole, where necessary on going into the hole, and which will maintain the hole of a gauge large enough to prevent wedging of the drill while the drilling is progressing.

I desire to provide reaming cutters which will be capable of a small outward movement in operation so as to cut a clearance about the head of the drill and allow the drill cutters to operate freely until they are worn out, and which will also provide against the necessity of reaming before the drill can be placed on the bottom of the well when a new bit is inserted.

In the drawing herewith, Fig. 1 is a section on the plane 1—1 of Fig. 3.

Figure 1:
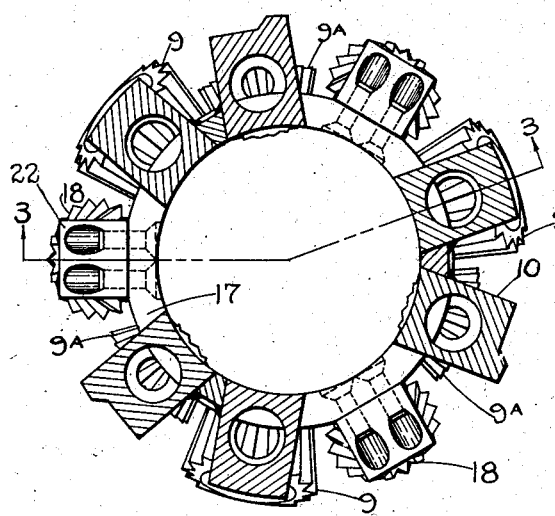
Figure 2:
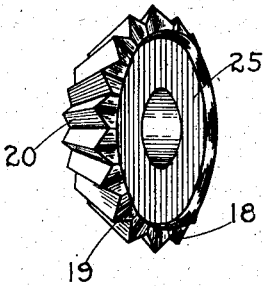
Fig. 2 is a perspective view of one of the reamer cutters.

The drill body 1 of my invention is shown as being of generally cylindrically tubular form, within which a core barrel 2 may be seated. The lower end of the head is formed with recesses 3 cut therein to receive and interfit with projections 4 upon the assembly ring or head 5. The outer face of the body has longitudinal ridges 6 thereon, said ridges furnishing a thickened wall in which are formed sockets 7 threaded to receive the tubular posts 8.

The head 5 is a ring upon which the cutters 9 and their supports 10 are mounted. The head is recessed somewhat at 31 to receive the cutters 9.

The said drill cutters are shown as being six in number, but the number may be varied depending on the size of the drill. There are three cutters 9 tapered inwardly and mounted to engage and cut the outer wall of the hole. There are also three cutters 9ª which are also tapered inwardly and mounted to engage and cut the inner wall of the hole. Each of these drill cutters are mounted upon a shaft 11 formed upon a support 10. The support 10 fits within one of the recesses 3 at the lower end of the body 1 and has a cylindrical recess 13 to receive the tubular post 8, which is slidably received therein. Each holder has a transverse groove or recess 14 to receive a key 15 which may also engage within a mating keyway or recess in the post 8, to secure the head of the bit to the body 1. Each holder 10 with its cutter mounted thereon is welded to the head or ring 5 and the cutter pins are welded at their ends to the head as shown at 16.

The drill cutters are arranged in sets of three and in order to better allow space to receive my reaming cutters, the drill cutters are shown spaced apart with two alternately arranged cutters in each group, leaving a space 17 between the groups to attach my reamers 18.

Figure 3:
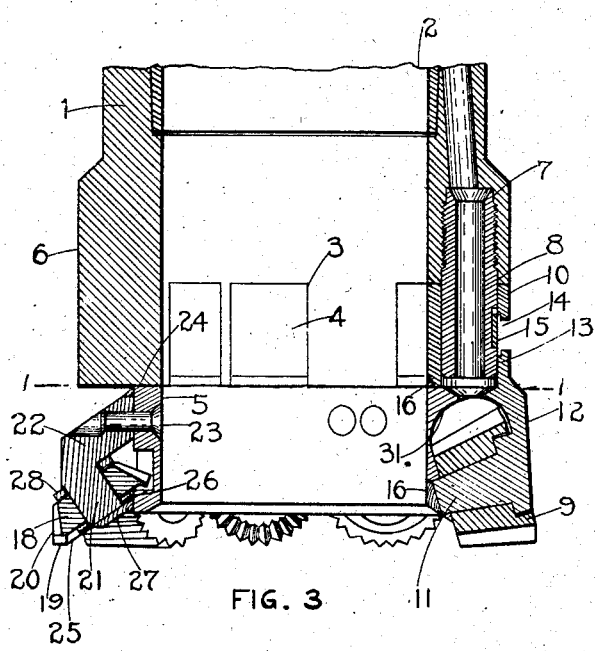
Fig. 3 is a vertical section taken on the plane 3—3 of Fig. 1, showing a core drill constructed in accordance with my invention.

Each reamer cutter 18 is formed of frusto-conical shape with the periphery toothed. At the base of the cutter radially extending teeth 19 are formed at the ends of the peripheral teeth 20. The reamer cutters are mounted on shafts 21 formed upon supports 22, the mounting being such that when the support is secured to the outer surface of the head, the shafts will be inclined downwardly and inwardly as shown in Fig. 3. The supports are secured to the head 5 by rivets 23 and by welding 24 or by any preferred means of attachment.

The base of the cutter is recessed at 25 to receive a washer 26 held in place by a plate 27 welded to the head. Above the cutter upon the shaft 21 is a washer 28 which is of material easily worn or broken. I have used babbit for this washer with success. The heat developed in use causes such a washer to wear away quickly. It serves to hold the cutter 18 downwardly and inwardly on the shaft while bit is being lowered in the hole, but when worm will allow the cutter to move upwardly and outwardly on the shaft and cut a wider hole. I have shown three of these reamer cutters and it is to be noted that these reamers are capable of attachment to a head when desired without material difficulty.

Figure 4:
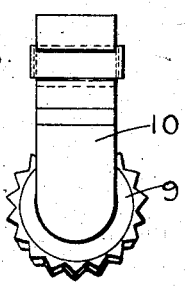
Fig. 4 is an outer side view of one of the drill cutters and its support.
Figure 5:
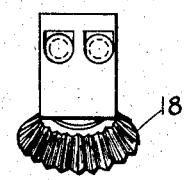
Fig. 5 is an outer side view of one of the reamer cutters and its support.

The cutters 9 and 9ª are mounted on their holders 10 as shown in Fig. 4. The holders are then secured to the ring 5 by welding at 16 as has been noted. The reamers are then riveted in place on the ring. The ring with the cutters thereon is then secured to the body 1 by inserting the holders into the recesses 3, telescoping over the posts 8, and the keys 15 are then inserted to lock the ring 5 and the cutters to the body.

When the drill is being inserted into the hole the reamer cutters will extend outwardly even with or slightly within the outer margins of the drill cutters 9 and will also extend downwardly slightly below the drill cutters 9. If, therefore, the hole is too small toward the bottom, the lower teeth 19 on the reamer cutters will engage and upon rotation of the drill will cut and ream the wall of the hole. By the time the drill is on bottom, or shortly after, the washers 28 will be worn out and the reamer cutters 18 will extend outwardly slightly beyond the drill cutters and will cut a slightly oversize hole of uniform diameter and will thus eliminate excessive wear on the gage surfaces of cutters 9. Consequently the diameter of the hole is maintained to full gage and new cutter head can be run to bottom of hole without excessive reaming.

The reaming elements will be seen to have an expanding feature due to the wearing away of the washers 28 and this is a feature of value. The drill will not be impeded in its action due to the close clearance cut by the main drill cutters and no time will be lost in reaming the hole to get a new bit to the bottom after one of these reaming drills has been used.

What I claim as new is:

1. A core drill including a body, a head thereon, rolling drill cutters mounted on said head, rolling reamer cutters on said head between said drill cutters, said reamer cutters being tapered upwardly and outwardly and having cutting teeth on the periphery and along the lower outer margin acting on the side wall of the hole and a beveled larger end presented downwardly and toothed to cut the bottom of the hole.

2. A core drill having a head, rolling drill cutters on said head arranged in sets spaced apart, rolling reamer cutters mounted on the outer periphery of said head and having the body of the cutter tapered upwardly and outwardly, cutting teeth on said reamer cutters presented outwardly and teeth on the larger end of the cutter also presented downwardly to engage the wall of the hole outside the gage of said drill cutters.

3. A core drill having a head, drill cutters on said head arranged in sets spaced apart, reamer cutters mounted on the outer periphery of said head and tapered upwardly and outwardly, cutting teeth on said reamer cutters presented outwardly and teeth also on the larger ends thereof presented downwardly to engage the bottom of the hole outside the gage of said drill cutters, and means to allow said reamer cutters to move automatically outwardly in use.

4. A core drill having a head, drill cutters on said head arranged in sets spaced apart, reamer cutters mounted on the outer periphery of said head and tapered upwardly and outwardly, washers of soft material above said reamer cutters adapted when destroyed in use to allow said cutters to move upwardly and outwardly, cutting teeth on said reamer cutters presented outwardly and teeth also presented downwardly to engage the bottom of the hole outside the gage of said drill cutters.

5. A core drill having a head, drill cutters on said head, reamer cutters mounted on supports attached to the outer face of said head, downwardly and inwardly inclined shafts upon said supports for said reamer cutters, means holding said reamer cutters downwardly on said shafts, said means tending to become ineffective in use and thus allow said reamer cutters to move upwardly and outwardly.

6. A core drill, reamer shafts thereon inclined downwardly and inwardly, reamer cutters on said shafts, and means holding said cutters downwardly on said shafts, said means being adapted to become ineffective in use and thus allow said cutters to move outwardly along said shafts.

In testimony whereof, I hereunto affix my signature this 25th day of September, A. D., 1931.

LOUIS H. WELLENSIEK.